UNITED STATES PATENT OFFICE.

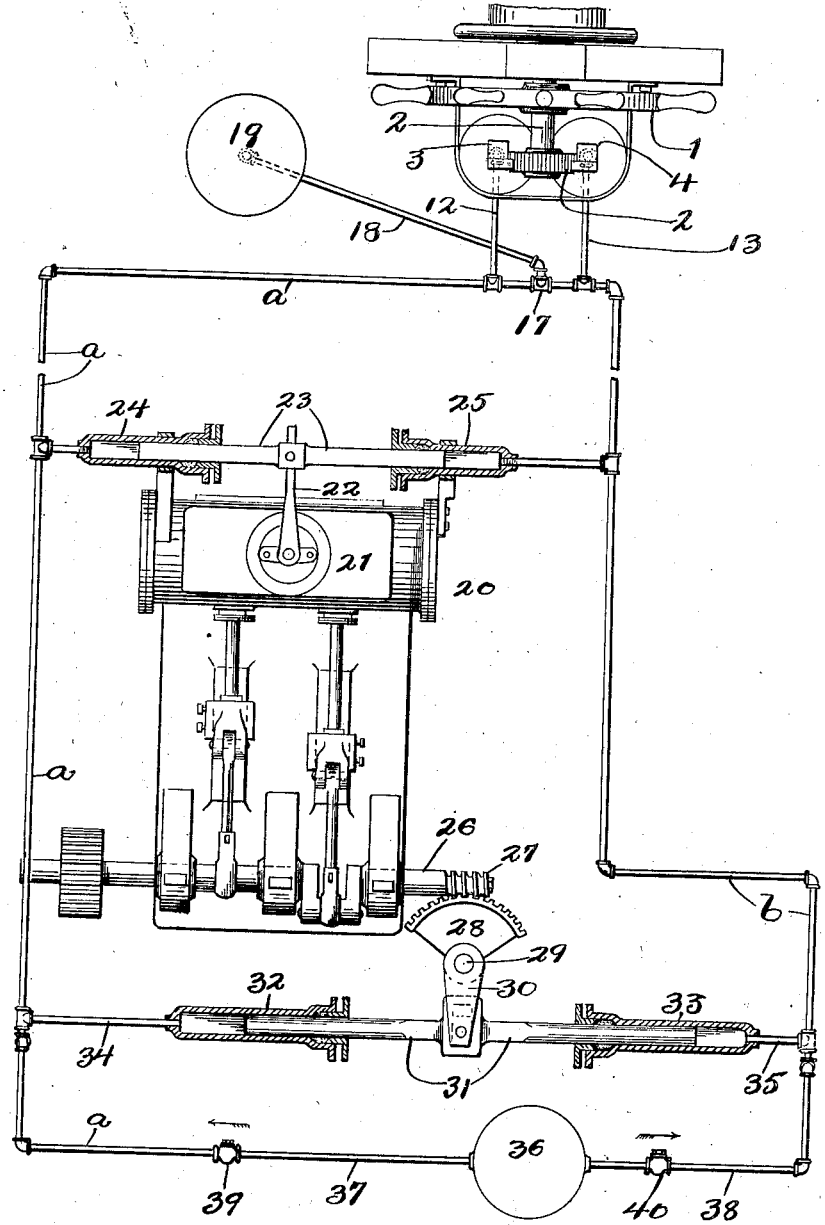

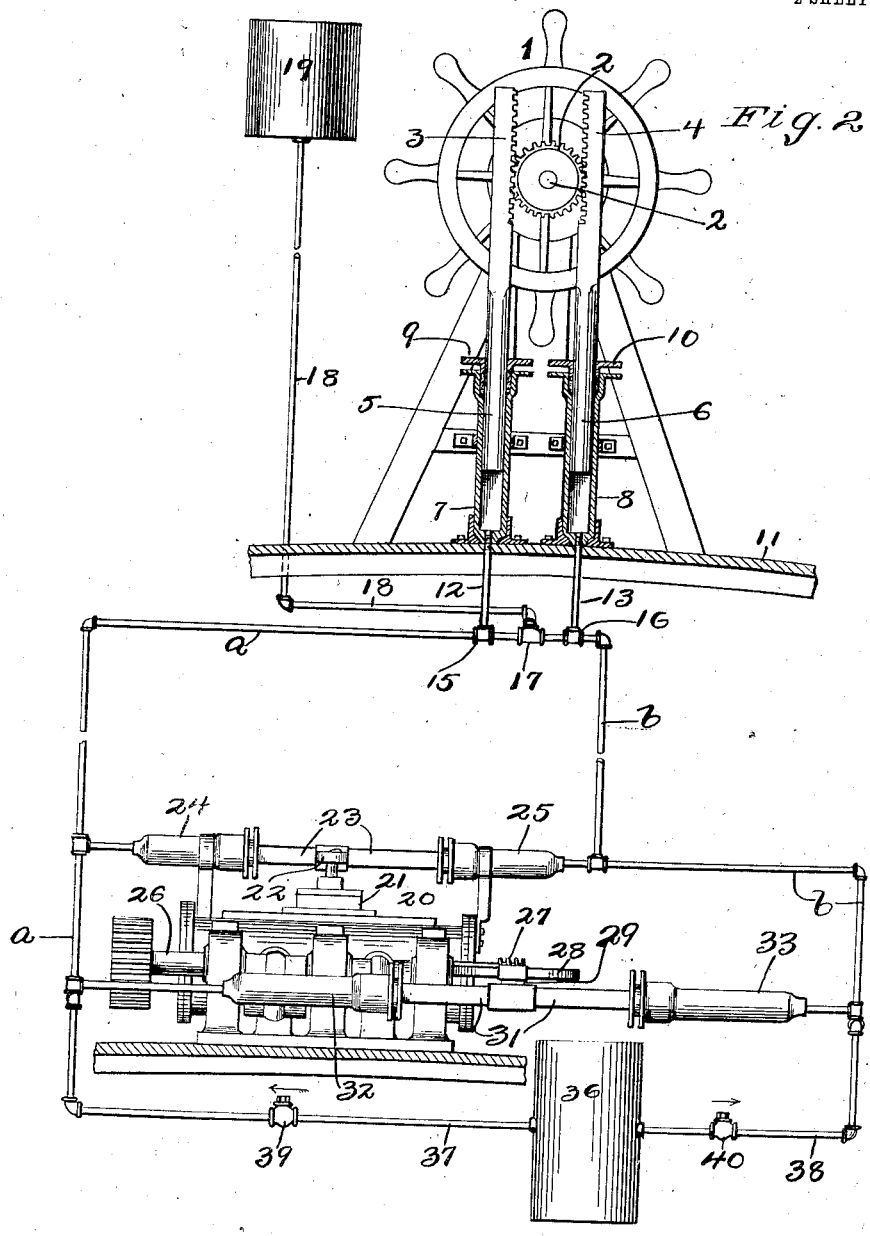

LINCOLN A. LANG, OF CLEVELAND, OHIO.

TELEMOTOR.

No. 897,907.　　　Specification of Letters Patent.　　　Patented Sept. 8, 1908.

Application filed October 10, 1907. Serial No. 396,870.

*To all whom it may concern:*

Be it known that I, LINCOLN A. LANG, a citizen of the United States of America, residing at Cleveland, in the county of Cuyahoga and State of Ohio, have invented certain new and useful Improvements in Telemotors; and I hereby declare the following to be a full, clear, and exact description of the invention, such as will enable others skilled in the art to which it pertains to make and use the same.

This invention relates to improvements in systems for transmitting motions or impulses from one apparatus or set of apparatus to another apparatus or set of apparatus and particularly to a liquid system of the type which is employed for the purpose of controlling the operation of a steering engine.

The object of the invention is to provide a liquid system of the character indicated which will automatically compensate for any leakage that may be produced in the system; which will automatically stop the motion of the engine or motor as soon as the movement of the wheel or other primary operating means is stopped; which will maintain within the pipes of the system an unbroken column of liquid; which will be simple in construction, positive and accurate in operation, and capable of being readily rectified or adjusted in case of derangement.

My invention comprises, in a system of this character, means for imparting to the liquid in a pipe system, at a point distant from the apparatus which is to be actuated, an impulse which will start the actuating apparatus and means for imparting to the liquid an impulse, due to the movement of the actuated apparatus, without affecting the means by which the first-mentioned impulse was imparted.

More particularly, my invention consists in providing, in combination with an actuating device (as a motor or engine), a driven device or apparatus receiving its motion therefrom, a liquid pipe system, means (which may be termed the "controlling means") arranged to be actuated by the liquid in the pipe system, acting under impulses imparted thereto so as to control the operation of the actuating device, means (which may be termed the "primary means") designed to be actuated or operated by a force applied outside of the pipe system for imparting an impulse to the liquid in said system which will operate the controlling means so as to start said actuating device, and means (which may be termed the "secondary means") designed to be actuated by the driven device for imparting to the fluid an impulse which will operate the controlling means without affecting the primary means, so as to stop the driving as soon as the driven device has completed the required movement, which movement is predetermined or governed by the impulse imparted to the liquid by the primary means.

In the embodiment of my invention illustrated in the drawings, there is disclosed the combination of a steering engine, a rudder-operating shaft arranged to be operated thereby and a liquid pipe system. The pipe system is divided by means of valves into two branches which, under normal conditions, have no intercommunication; but each branch is adapted to communicate under certain conditions with a common reservoir. Each branch of the pipe system is provided with three enlargements in the form of cylinders, which may be termed the "primary cylinder", the "secondary cylinder" and the "controlling cylinder", the whole pipe system having therein a pair of primary cylinders, a pair of secondary cylinders, and a pair of controlling cylinders. In each cylinder there is arranged a plunger, and the plungers in each pair of cylinders are operatively connected together and the arrangement is such that the movement of one plunger will produce a movement, similar in extent but opposite in character, of the plunger connected thereto. The plungers in the primary cylinders are operatively connected to the external actuating device, in this case the steering wheel, so that by turning the wheel in either direction one plunger will be pressed into its cylinder and the other will be correspondingly withdrawn. The plungers in the secondary cylinders are operatively connected with the shaft which turns the rudder and thus with the rudder, so that whichever way the rudder may be turned, one plunger will be forced into its cylinder and the other plunger will be forced outwardly with respect to its cylinder. The plungers in the controlling cylinders are operatively connected with the steam valve of the engine (or other operating or actuating device) so that as one plunger moves inwardly within its cylinder the other is forced outwardly and the steam valve will be opened, closed and reversed thereby. At an elevated point, as in the pilot-house, there is located a tank from which extends a pipe which is connected with the pipe system at a point between the two pipes which connect the primary plungers therewith. At the point of connection of the first-mentioned pipe with the system there is provided a three-way valve by means of which communication between said pipe and the system may be entirely cut off and communication between both sides or branches of the system and the tank may be established. At the lowest point of the system and at the point most remote from the primary cylinders, there is provided a tank containing liquid, said tank communicating with both sides or branches of the system, there being check valves interposed between said tank and the two sides or branches of the system. The secondary cylinders are located adjacent to the last-mentioned tank and communicates with the opposite sides or branches of the system at points beyond the check valves.

Referring to the drawings, Figure 1 represents a top plan view showing my system as applied to a steering wheel and a starting engine of any approved construction, the controlling and secondary cylinders being shown in section. Fig. 2 represents an end elevation of the apparatus shown in Fig. 1, a portion of the decks and the primary cylinders being shown in section.

Describing the parts by reference characters, 1 represents the external actuating or operating device, in this case the steering wheel. The wheel is provided on its axle with a spur gear 2 meshing with racks 3 and 4 arranged on opposite sides thereof, said racks being carried by plungers 5 and 6 respectively. The lower ends of these plungers are fitted within cylinders 7 and 8 respectively. The plungers are preferably of uniform diameter, enabling them to be fitted liquid-tight into their cylinders with the employment of externally located packing glands 9 and 10.

11 denotes the deck of the pilot-house on which cylinders 7 and 8 are supported. From the bottoms of these cylinders there extend pipes 12 and 13 communicating respectively with the opposite sides or branches $a$ and $b$ of the pipe system.

14 denotes a short pipe connecting the opposite branches of the system and preferably fitted to the tees 15 and 16 by means of which the pipes 12 and 13 are connected to the system.

17 denotes a three-way valve by means of which both branches of the pipe system may be placed in communication with each other and with the pipe 18 leading to the elevated tank 19. Ordinarily this valve will be closed and there will be no communication of the opposite branches of the system with each other or with the tank 19.

20 denotes the steering engine by means of which the rudder, or other device, is operated. This engine is provided with a valve chest 21 which will be provided with any preferred form of steam valve having an operating lever 22 for opening, closing, and reversing the valve. The end of this lever is suitably connected to the middle portion of a double-acting plunger 23, the opposite ends of which are fitted within the controlling cylinders 24, 25 respectively, the former cylinder being in communication with branch $a$ of the system and the latter cylinder being in communication with branch $b$. The opposite ends of the plunger 23 are fitted into the controlling cylinders 24 and 25 in the same manner as plungers 5 and 6 are fitted into their cylinders.

The engine 20 is connected with the rudder-operating shaft 26, one end of said shaft being provided with a worm 27 meshing with a segment 28 carried by shaft 29 which has rigid therewith an arm 30 operatively connected to the middle portion of a double acting plunger 31, the opposite ends of which are fitted within the secondary cylinders 32 and 33 in the same manner as ends of plunger 23 are fitted into cylinders 24 and 25. The secondary cylinders are connected with the branches $a$ and $b$ respectively of the pipe system by means of pipe connections 34 and 35 respectively.

Adjacent to the points of connection of the cylinders 32 and 33 with the system there is located a pressure tank 36 within which there is stored liquid. This tank is connected with the opposite branches of the system by means of pipes 37 and 38, each having therein a check valve 39, 40 respectively, said check valves being arranged to permit the flow of liquid from the tank into the branches of the system under conditions to be described hereinafter, but to prevent the flow of liquid from said branches into the tank.

It will be noted, particularly from an inspection of Fig. 2, that the pipes 37 and 38 are the lowest part of the system and that the tank 36 and said pipes are remote from the primary cylinders. This location is important in insuring the automatic operation of the tank to supply liquid to either side of the system, as occasion may require, in order to restore the pressure therein.

With the parts constructed and arranged as described, the operation will be as follows:—When wheel 1 is rotated in either direction, one of the plungers 5, 6 will be depressed and the other elevated. Assume that the wheel be turned to the left, that is, contrary to the direction of rotation of the hands of a clock. Plunger 5 will be depressed within its cylinder and plunger 6 will be correspondingly elevated. The depression of plunger 5 causes pressure to be exerted upon the liquid contained within the branch $a$ of the system. The liquid, thus subjected to pressure, moves plunger 23 to the right carrying with it lever 22 which is connected with the steam valve and opens the said valve. This admits steam to the engine 20 and causes the shaft 26 to be correspondingly rotated. The connections between the engine and shaft and between the shaft and the plunger 31 are such that, when plunger 23 is moved to the right, plunger 31 will also be moved to the right by the arm 30. During the rotation of shaft 26, plunger 31 continues to travel to the right, forcing the liquid from the branch $b$ of the system into the primary cylinder 8. As long as the wheel 1 is being turned in the direction set forth, the liquid in branch $b$ will simply rise within primary cylinder 8. As soon as the rotation of the wheel is stopped, however, there will be no more space provided in cylinder 8 for the liquid which is being forced thereinto by plunger 31 and the liquid will then exert a pressure within the controlling cylinder 25 which will move the plunger 23 to the left and thereby shift the steam valve to closed position. In like manner, if plunger 6 be depressed, by rotating the wheel 1 in a direction the reverse of that above described, plunger 23 will be moved to the left and the steam valve will be opened to admit the steam to the reverse side of the piston or pistons in the engine 20. This will cause shaft 26 to be rotated in a reverse direction, forcing plunger 31 to the left. When the movement of the wheel is stopped, the plunger 23 will be carried to the position shown in the drawings and the rotation of shaft 26 will be automatically stopped through the positive re-actory circulation set up within branch $a$ by plunger 31.

From the construction described, it follows that a given displacement of the wheel must always be followed by a proportional number of turns of the power or engine-shaft and a proportional movement of the rudder; hence the position of the steering wheel is always an index of the position of the engine and of the rudder (or whatever other device the engine may actuate), there being no necessity for turning the steering wheel to a given point in order to cause the stoppage of the engine. Furthermore, after the engine has been started in either direction, if the rotation of the wheel be continued, the engine will continue to operate steadily since, under such conditions, the liquid displaced by the plunger 31 will have space provided for it in the appropriate primary cylinder and hence will not exert sufficient pressure upon plunger 23 to shift the steam valve. The valve will, therefore, be kept open as long as the rotation of the wheel is continued. When this rotation is discontinued, the circulation from plunger 31 into the corresponding primary cylinder being blocked, the liquid will instantly exert its pressure upon the plunger 23 to close the valve.

A further important advantage in my invention resides in its adaptability to automatically maintain the pipe system full of liquid. In ordinary practice, the rotation of the steering wheel in either direction sets up an increased pressure in one branch of the system, such increased pressure being due to the resistance offered by the pipe, the plunger 23 and the valve-operating lever 22, with a corresponding diminution of pressure in the other branch of the system. Under these conditions, the tendency to leakage will be greatest in the side or branch wherein the highest pressure exists. With the arrangement and location of feed-tanks with which I am familiar, any replacement of liquid occurs within the branch in which the lowest pressure exists, with the result that there is liability to derange the system by the presence of more liquid in one branch than in the other thereof. The location of the tank 36 near the secondary cylinders 32, 33 and remote from the primary cylinders 7 and 8, together with the check valves 38 and 39 which permit liquid to flow only from the tank into the branches of the system, not only prevents this undesirable action but maintains a proper balance between the two branches of the system by supplying liquid to the side wherein the leakage occurs. Owing to the movement of the plunger 31 toward the low-pressure branch of the system and the location of such plunger and the secondary cylinders near the tank 36, as well as the low level at which said tank and cylinders are located, there will be a tendency to a reduction of pressure on the high pressure side of the system adjacent to the tank 36. When this tendency to low pressure is increased by leakage, the higher pressure within the tank 36 will cause the liquid to flow therefrom through the appropriate check valve into the high pressure branch of the system and automatically replace the amount lost by leakage in the branch wherein such leakage has occurred. This action will be easily understood if we suppose that the movement of the steering wheel has run up the pressure in branch $a$ to say 50 pounds and has reduced the pressure in branch $b$ to at or near the pressure of the atmosphere. Suppose that a quantity of liquid has leaked out of branch $a$, owing to the temporarily increased pressure therein. As soon as plunger 31 begins to move, due to the rotation of the engine shaft, the pressure in branch $a$ instantly falls, particularly in the vicinity of cylinder 32, to or nearly equal to the pressure of the atmosphere while the pressure in branch $b$ at or near cylinder 33 is increased, say to 50 pounds. Under these conditions, an additional supply of liquid will flow into branch a through the decreased pressure therein adjacent to plunger 31 and the pumping action of plunger 31 on said branch.

When the apparatus has been out of operation for some time, a considerable quantity of liquid may have escaped from the system through leakage, thereby rendering it inoperative. To avoid this contingency, the three-way valve 17 may be opened when the system is out of operation, thereby placing tank 19 in communication with both sides of the system. The tank provides a vent whereinto any air which may be within the system may escape and keeps the pipes and system full of liquid and ready for instant use upon merely closing the valve 19. This valve may also be used as a by-pass should it become necessary to change the relationship between the steering wheel and the engine.

The tank 36 may be a pressure tank, but it will be unnecessary, for most of the purposes of my invention, to maintain therein a pressure above that of the atmosphere, as the pumping action of the plunger 31, with the loss of pressure due to leakage, will cause the liquid to flow from said tank into the appropriate side of the system.

What I claim is:—

1. In a system of the character described, the combination, with an actuating device and a device driven or actuated thereby, of a liquid-holding pipe system, controlling means for said actuating device arranged to be acted upon by the liquid in said system, means for imparting to the liquid in the system an impulse which will operate the controlling means to start the actuating device, and means for imparting to the liquid in the system an impulse which will operate the controlling means to stop the actuating device, substantially as specified.

2. In a system of the character described, the combination, with an actuating device and a device driven or actuated thereby, of a liquid-holding pipe system, controlling means for said actuating device arranged to be acted upon by the liquid in said system, means for imparting to the liquid in said system an impulse which will operate the controlling means to start the actuating device, and means for imparting to the liquid in the system an impulse which will operate the controlling means to stop the actuating device without affecting the means by which the primary impulse has been imparted to the liquid to start the actuating device, substantially as specified.

3. In a system of the character described, the combination, with an actuating device and a device driven or actuated thereby, of a liquid-containing pipe system, controlling means for said actuating device arranged to be acted upon by the liquid in said system, means for imparting to the liquid in the system an impulse which will operate the controlling means to start said actuating device, and means, operative by the movement of the driven or actuated device, for imparting to the liquid in the system an impulse which will operate the controlling means to stop the actuating device, substantially as specified.

4. In a system of the character set forth, the combination, with an actuating device and a device driven or actuated thereby, of a liquid-containing pipe system, controlling means for said actuating device arranged to be acted upon by the liquid in the system, means for imparting to the liquid in said system an impulse which will operate the controlling means to start the actuating device, and means, operative by the movement of the driven device, for imparting to the liquid an impulse which will operate the controlling means to stop the actuating device without affecting the means which imparts the first-mentioned impulse to the actuating device, substantially as specified.

5. In an apparatus of the character described, the combination, with an actuating device and a device driven thereby, of a liquid-holding pipe system comprising two normally non-communicating branches, controlling means communicating with both of said branches and adapted to operate said actuating device, means for simultaneously applying pressure to one branch of the system and relieving pressure in the opposite branch, thereby moving said controlling means, and means, communicating with both branches of said system and operated by said driven device, for simultaneously reversing the pressures in the branches of the system, substantially as specified.

6. In an apparatus of the character described, the combination of a liquid-holding pipe system comprising normally non-communicating branches, a driving or actuating device, a driven device, plunger mechanism having opposite sides thereof connected with both branches and serving to control said actuating device, plunger mechanism located adjacent to the driven member and arranged to be operated thereby, means for imparting to the liquid in one branch of the system an impulse tending to force the first-mentioned plunger mechanism in one direction, and connections whereby the operation of the driven device moves its plunger mechanism the same direction as the former mechanism, substantially as specified.

7. In a device of the character set forth, the combination of a liquid-holding pipe system comprising two normally non-communicating branches, an engine, a valve-operating device therefor, an engine shaft driven by said engine, a pair of cylinders communicating respectively with opposite branches of said system, connected plungers in said cylinders, a valve-operating lever connected therewith, a pair of cylinders adjacent to the shaft and connected respectively with opposite branches of said system, a pair of connected plungers in said cylinders, means for imparting to either branch of the system pressure for operating the first-mentioned plungers in one direction to operate the valve, and connections between the engine shaft and the other plungers to operate the same in the same direction as the former plunger, substantially as specified.

8. In an apparatus of the character set forth, the combination of a wheel, a pair of vertically extending cylinders, plungers in the said cylinders and each operatively connected with said wheel and arranged to be moved in reverse directions by the rotation thereof, a liquid-holding pipe system comprising two normally non-communicating branches, each branch being connected with one of the aforesaid cylinders, controlling cylinders connected with opposite branches of said cylinder, a plunger for each of said cylinders, an engine, a valve-operating device therefor connected to the last-mentioned plungers, a device driven or actuated by said engine, a pair of secondary cylinders connected respectively with opposite branches of said pipe system, a plunger common to the last-mentioned cylinders, and an operative connection between said plungers and said driven device, substantially as specified.

9. In an apparatus of the character set forth, the combination, with an actuating device and a device driven or actuated thereby, of a liquid-holding pipe system, controlling means for said actuating device arranged to be acted upon by the liquid in said pipe system, means for imparting to the liquid an impulse which will operate the controlling means to start the actuating device, means for imparting to the liquid an impulse which will operate the controlling means to suspend the operation of such actuating device, and means for automatically replacing liquid lost from the system, substantially as specified.

10. In an apparatus of the character set forth, the combination, with an actuating device and a device driven or actuated thereby, of a liquid-holding pipe system, controlling means for said actuating device arranged to be acted upon by the liquid in said pipe system, means for imparting to the liquid an impulse which will operate the controlling means to start the actuating device, means for imparting to the liquid an impulse which will operate the controlling means to suspend the operation of such actuating device, and means, located adjacent to the last-mentioned means, for automatically replacing liquid lost from the system, substantially as specified.

11. In an apparatus of the character set forth, the combination, with an actuating device and a device driven or actuated thereby, of a liquid-containing pipe system comprising two normally non-communicating branches, an elevated tank having a pipe connected with said branches and valve mechanism for placing said tank into communication with both branches of said system, means located adjacent to said tank for imparting impulses to the liquid contained in either branch of said system, a controlling device adapted to be operated by such impulses for operating the actuating device reversely, and means operated by the driven device for creating an impulse in the system to move the controlling device in a reverse direction from that given it by the first-mentioned means, substantially as specified.

12. In a device of the character indicated, the combination, with an engine and a device arranged to be operated thereby, of a fluid-holding pipe system, controlling means arranged to be actuated by the liquid in said pipe system acting under impulses imparted thereto, primary means, designed to be actuated by a force outside of said pipe system, for imparting an impulse to the fluid in said pipe system which will operate the controlling means to start said engine, and secondary means, arranged to be actuated by said device, for imparting to the liquid in the pipe system an impulse which will operate the controlling means to stop the said device without affecting the primary means as soon as the said device has completed the required movement, substantially as specified.

13. In a device of the character indicated, the combination, with an engine provided with a suitable controlling valve and a device arranged to be operated by said engine, of a liquid-holding pipe system, primary, secondary and controlling cylinders arranged in open communication with said pipe system, plungers arranged in said cylinders, means which can only be operated by a force outside of said system arranged to actuate the plunger in the primary cylinder, means for connecting the plunger in the secondary cylinder with said device, and means for connecting the plunger in the controlling cylinder with the valve mechanism of said engine, substantially as specified.

14. In a device of the character indicated, the combination, with an engine and a shaft arranged to be operated thereby, of a liquid-holding pipe system consisting of two branches which, under normal conditions, have no intercommunication, a primary cylinder, a secondary cylinder and a controlling cylinder arranged in communication with each branch, a plunger arranged in each cylinder, means for operatively connecting the plungers in the respective pairs of primary cylinders, secondary cylinders and controlling cylinders so that the movement of a plunger will cause a movement of the plunger connected to it which will be similar in extent but opposite in character, means, which can only be operated by a force outside of said system, arranged to actuate the plungers in the primary cylinders, means for connecting the plungers in the secondary cylinders with said shaft, and means for connecting the plungers in the controlling cylinders with the valve mechanism of said engine, substantially as specified.

15. In a device of the character indicated, the combination, with an actuating device and a device driven or actuated thereby, of a liquid-holding pipe system for controlling the operation thereof comprising one or more primary cylinders with plungers working therein, means for actuating said plungers, one or more secondary cylinders with plungers working therein, means for actuating said plungers, one or more controlling cylinders with plungers working therein, and pipes connecting together said primary, secondary and controlling cylinders to form a system in which pressure applied by means of the plungers in the primary cylinders will actuate the plungers of said controlling cylinders without affecting the plungers of the secondary cylinders, substantially as specified.

16. In a system of the character indicated, the combination, with an engine provided with a suitable controlling valve and a device arranged to be operated thereby, of a fluid-holding pipe system consisting of two branches which, under normal conditions have no intercommunication, a reservoir, pipes connecting said reservoir with each of the said branches of the said pipe system, automatically operating valves arranged in the said connecting pipes and designed to open in either direction according as the pressure in the reservoir is greater or less than the pressure in the pipe system, a primary cylinder, a secondary cylinder and a controlling cylinder arranged in communication with each pipe branch, a plunger arranged in each cylinder, means for operatively connecting the plungers in the respective pairs of primary cylinders, secondary cylinders and controlling cylinders so that the movement of a plunger will cause a movement of the plunger connected to it which will be similar in extent but opposite in character, means which can only be operated by a force outside of said system arranged to actuate the plungers in the primary cylinders, means for connecting the plungers in the secondary cylinders with the said device, and means for connecting the plungers in the controlling cylinders with the valve mechanism of said engine, substantially as specified.

17. In a device of the character indicated, the combination, with an engine and a device arranged to be operated thereby, of a liquid-holding pipe system consisting of two branches which, under normal conditions, have no intercommunication, a primary cylinder, a secondary cylinder and a controlling cylinder arranged in communication with each pipe branch, a plunger arranged in each cylinder, means for actuating the plungers in the primary cylinders, means for connecting the plungers in the secondary cylinders with said device, and means for connecting the plungers in the controlling cylinders with the valve mechanism of said engine, substantially as specified.

18. In a system of the character indicated, the combination, with an engine and a device arranged to be operated thereby, of a liquid-holding pipe system consisting of two branches which, under normal conditions, have no intercommunication, a primary cylinder, a secondary cylinder and a controlling cylinder arranged in communication with each pipe branch, a plunger arranged in each cylinder, means for actuating the plungers in the primary cylinders, means for connecting the plungers in the secondary cylinders with said device, means for connecting the plungers in the controlling cylinders with the valve mechanism of said engine means for establishing the equilibrium of the fluid in said system, and means for automatically applying additional fluid thereto to take the place of the fluid lost through evaporation or other causes, substantially as specified.

19. In a system of the character indicated, the combination, with an engine and a device arranged to be operated thereby, of a liquid-holding pipe system consisting of two branches which, under normal conditions, have no intercommunication, a primary cylinder, a secondary cylinder and a controlling cylinder arranged in communication with each pipe branch, a plunger arranged in each cylinder, means for actuating the plungers in the primary cylinders, means for connecting the plungers in the secondary cylinders with said device, means for connecting the plunger in the controlling cylinders with the valve mechanism of said engine, and means for establishing the equilibrium of the fluid in said system, substantially as specified.

20. In a system of the character indicated, the combination, with an engine provided with a suitable controlling valve and a device arranged to be operated thereby, of a liquid-holding pipe system consisting of two branches which under normal conditions have no intercommunication, a reservoir, pipes connecting said reservoir with the branches of said pipe system, automatically operating valves arranged in said connecting pipes and designed to open when the pressure in the reservoir is greater than the pressure in the pipe system, a primary cylinder, a secondary cylinder and a controlling cylinder arranged in communication with each branch, a plunger arranged in each cylinder, means for operating the plungers in the primary cylinders, means for connecting the plungers in the secondary cylinders to the said device, and means for operatively connecting the plungers in the controlling cylinders with the controlling valve of the engine, substantially as specified.

21. In a system of the character indicated, the combination, with an engine provided with a suitable controlling valve and a shaft arranged to be operated thereby, of a liquid-holding pipe system consisting of two branches which under normal conditions have no intercommunication, a reservoir, pipes connecting said reservoir with said branches of said pipe system, automatically operating valves arranged in said connecting pipes and designed to open when the pressure in the reservoir is greater than the pressure in the pipe system, a primary cylinder, a secondary cylinder and a controlling cylinder arranged in communication with each branch, a plunger arranged in each cylinder, means for operating the plungers in the primary cylinders, means for connecting the plungers in the secondary cylinders to the shaft and means for operatively connecting the plungers in the controlling cylinders with the controlling valve of the engine, substantially as specified.

22. In a system of the character set forth, the combination, with an actuating device and a device driven or actuated thereby, of a liquid-containing pipe system, means for imparting to the liquid in said system an impulse to operate said actuating device, means for automatically replacing liquid lost from said system, a tank adapted to communicate with the highest part of the system, and a valve for placing said system in communication with said system, substantially as specified.

23. In a system of the character set forth, the combination of a liquid-containing pipe system, primary means for imparting impulses to said system at the highest point of the system, an actuating device adapted to be operated by said impulses, an actuated or driven device operative by the former device, and means, located in the lowest portion of said system, for automatically supplying liquid thereto, substantially as specified.

24. In a system of the character set forth, the combination of a liquid-containing pipe system, a tank having a connection therewith at the highest point thereof, a valve adapted to place said tank into communication with said system, primary means for imparting impulses to said system, an actuating device adapted to be operated by said impulses, an actuated or driven device operative by the former device, and a tank located in and communicating with the lowest portion of said system for automatically supplying liquid thereto, substantially as specified.

In testimony whereof, I sign the foregoing specification, in the presence of two witnesses.

LINCOLN A. LANG.

Witnesses:
VICTOR C. LYNCH,
N. L. McDONNELL.